United States Patent
Wootton et al.

(10) Patent No.: US 10,112,572 B2
(45) Date of Patent: Oct. 30, 2018

(54) AIR-BAGS

(71) Applicant: Autoliv Development AB, Vårgårda (SE)

(72) Inventors: Gary Wootton, Stoke on Trent (GB); Helen Dean, Wilmslow (GB)

(73) Assignee: AUTOLIV DEVELOPMENT AB, Vargarda (SE)

( * ) Notice: Subject to any disclaimer, the term of this patent is extended or adjusted under 35 U.S.C. 154(b) by 187 days.

(21) Appl. No.: 15/302,069

(22) PCT Filed: Apr. 2, 2015

(86) PCT No.: PCT/SE2015/050409
§ 371 (c)(1),
(2) Date: Oct. 5, 2016

(87) PCT Pub. No.: WO2015/156726
PCT Pub. Date: Oct. 15, 2015

(65) Prior Publication Data
US 2017/0120857 A1    May 4, 2017

(30) Foreign Application Priority Data
Apr. 7, 2014  (EP) .................................... 14163727

(51) Int. Cl.
*B60R 21/235*    (2006.01)
*B60R 21/213*    (2011.01)
(Continued)

(52) U.S. Cl.
CPC .......... *B60R 21/235* (2013.01); *B60R 21/213* (2013.01); *B60R 21/232* (2013.01);
(Continued)

(58) Field of Classification Search
CPC ... B60R 21/235; B60R 21/237; B60R 21/232; B60R 21/213; B60R 2021/0018;
(Continued)

(56) References Cited

U.S. PATENT DOCUMENTS 5,431,193 A * 7/1995 Mood .................. D03D 41/004
                                                     139/11
5,651,395 A * 7/1997 Graham .................. B60R 21/23
                                                     139/390

(Continued)

FOREIGN PATENT DOCUMENTS

| EP | 2540580 A1 | 1/2013 |
|---|---|---|
| JP | 2004270053 A | 9/2004 |
| JP | 2004306666 A | 11/2004 |

OTHER PUBLICATIONS

International Search Report and Written Opinion of the ISA for PCT/SE2015/050409, ISA/SE, Stockholm, dated Jul. 27, 2015.

*Primary Examiner* — Drew J Brown
*Assistant Examiner* — Timothy Wilhelm
(74) *Attorney, Agent, or Firm* — Stephen T. Olson; Harness, Dickey & Pierce, P.L.C.

(57) ABSTRACT

An air-bag for a motor vehicle is formed from first and second superposed layers of fabric, each woven from a plurality of yarns. The layers of fabric are connected to each other at least partially through interweaving of the yarns of the two layers with each other. The air-bag includes at least one inflatable region, in which the two layers of fabric are substantially not connected to each other, and at least one non-inflatable region. There is a first number of crossing points of yarns that form the one layer of fabric, and there is a second number of connections between the two layers, wherein at each connection a yarn of the layer of fabric extends across to the other layer and passes over the far side (Continued)

of the a yarn of the other layer, and wherein the second number is no more than 0.0033 times the first number.

16 Claims, 4 Drawing Sheets

(51) Int. Cl.
*B60R 21/232* (2011.01)
*B60R 21/237* (2006.01)
*B60R 21/00* (2006.01)
*B60R 21/231* (2011.01)

(52) U.S. Cl.
CPC .... *B60R 21/237* (2013.01); *B60R 2021/0018* (2013.01); *B60R 2021/23192* (2013.01); *B60R 2021/23509* (2013.01); *B60R 2021/23542* (2013.01); *B60R 2021/23547* (2013.01); *B60R 2021/23571* (2013.01)

(58) Field of Classification Search
CPC .......... B60R 2021/23509; B60R 2021/23192; B60R 2021/23571; B60R 2021/23547; B60R 2021/23552; B60R 2021/23542
See application file for complete search history.

(56) References Cited

U.S. PATENT DOCUMENTS

| | | | | |
|---|---|---|---|---|
| 6,431,589 B1* | 8/2002 | Heigl | .................... | B60R 21/201 |
| | | | | 280/730.2 |
| 6,698,458 B1* | 3/2004 | Sollars, Jr. | .............. | B32B 27/02 |
| | | | | 139/387 R |
| 6,733,211 B1* | 5/2004 | Durie | .................... | D03D 11/00 |
| | | | | 139/383 R |
| 6,742,805 B2* | 6/2004 | Hill | ....................... | B60R 21/235 |
| | | | | 280/730.2 |
| 7,597,346 B2* | 10/2009 | McHugh | ............... | B60R 21/233 |
| | | | | 280/729 |
| 7,681,602 B2* | 3/2010 | Youn | ........................ | D03D 1/02 |
| | | | | 139/383 R |
| 8,276,938 B2* | 10/2012 | Yamamoto | ............ | B60R 21/232 |
| | | | | 280/730.2 |
| 9,283,922 B2* | 3/2016 | Fischer | ................ | B60R 21/2334 |
| 2002/0122908 A1* | 9/2002 | Li | ........................... | B32B 27/12 |
| | | | | 428/36.2 |
| 2009/0224521 A1* | 9/2009 | Huber | ...................... | D03D 1/02 |
| | | | | 280/743.1 |
| 2014/0021705 A1* | 1/2014 | Youn | ...................... | B60R 21/235 |
| | | | | 280/730.1 |

* cited by examiner

AIR-BAGS

CROSS-REFERENCE TO RELATED APPLICATIONS

This application is a 371 U.S. National Stage of International Application No. PCT/SE2015/050409, filed Apr. 2, 2015, which claims the benefit of and priority to European Patent Application No. 14163727.2, filed Apr. 7, 2014. The entire disclosures of the above applications are incorporated herein by reference.

FIELD

This invention relates to air-bags, and in particular concerns air bags having both inflatable and non-inflatable regions.

BACKGROUND

It is common in certain types of air-bag for there to be both inflatable and non-inflatable regions. For example, FIG. 1 shows a schematic view of a conventional inflatable curtain (IC) type air-bag. Prior to inflation, an air-bag of this kind is typically stored in a rolled and/or folded fashion along the roofline of the vehicle, above the side windows. When the air-bag is activated (if, for instance, a roll-over situation is detected), the air-bag is inflated and unrolls downwardly to cover the front and rear side windows, as well as the B-pillar. This provides cushioning if a vehicle occupant is thrown against the internal side wall of the vehicle, and also presents a barrier which helps to prevent the occupant from being thrown out of the vehicle through the window.

Referring to FIG. 1, the air-bag 1 comprises a number of inflatable regions, including a main gas delivery passage 2 which runs along an upper edge of the air-bag 1, and a series of inflatable cells 3 which are generally parallel with each other and in communication at one end with the main gas delivery passage. A first group 4 of the inflatable cells 3 is, after deployment, aligned with the vehicle's front side window, and a second group 5 of the inflatable cells 3 is aligned with the vehicle's rear side window.

Between the first and second groups 4, 5 of inflatable cells 3 lies a non-inflatable region 6 of the air-bag 1, which is generally aligned with the vehicle's B-pillar.

An air-bag of this type is typically formed in a one-piece woven (OPW) construction, in which two superimposed layers of fabric are woven simultaneously on a loom. In selected regions, the layers are interwoven with one another, as is known in the art. To form the inflatable regions 2, 3, the two layers are not interwoven with each other. A space is therefore formed between the layers, into which gas may be introduced to inflate the inflatable regions 2, 3.

In regions immediately surrounding the inflatable regions 2, 3, the layers are strongly interwoven to form substantially gas-tight boundaries for the inflatable regions 2, 3. Referring to FIG. 1, interwoven regions 7 of this type are formed around the gas delivery passage 2, and around the inflatable cells 3. These interwoven regions 7 must be mechanically robust, as substantial forces will be placed on them as the inflatable regions 2, 3 are inflated during rapid deployment of the air-bag 1, and also if a vehicle occupant is thrown against the air-bag 1 during an accident situation.

The two layers from which the air-bag 1 is formed will typically comprise fabric layers, formed from interwoven warp and weft yarns. The warp yarns are substantially perpendicular to the weft yarns. In an uninterrupted region of each layer, each warp yarn may pass alternately under and over each weft yarn that is encountered along its length. Similarly, each weft yarn may pass alternately under and over each warp yarn that is encountered along its length. In alternative weaving patterns, such as a "herringbone" pattern, a yarn of one type may pass under or over two or more consecutive yarns of the other type that are encountered along its length. The skilled person will understand that different suitable weave types may be used.

In interwoven regions, some of the warp and/or weft yarns that form one or both layers pass across to the other layer, and are interwoven with the yarns of the other layer, thus forming connections between the two layers.

Since the interwoven regions 7 that bound the inflatable regions 2, 3 must be strong and reliable, a large proportion of the yarns of the two layers are involved in connections between the two layers in these regions 7. For example, 100% of the yarns in these regions 7 may be involved in interconnections between the layers. The non-inflatable region 6 is bounded by interwoven regions 7, and is not connected to any of the inflatable regions 2, 3. There is therefore no requirement for the two layers of the air-bag 1 to be tightly interwoven in the non-inflatable region 6. It is also desirable for the non-inflatable region 6 to have a low stiffness, to assist in ease of rolling the air-bag 1 when installing the air-bag 1 in a vehicle.

SUMMARY

It is an object of the present invention to seek to provide an improved air-bag of this type.

Accordingly, one aspect of the present invention provides an air-bag for a motor vehicle, the air-bag being formed from two superposed layers of fabric, each of the layers being woven from a plurality of yarns, the layers of fabric being connected to each other at least partially through interweaving of the yarns of the two layers with each other, wherein the air-bag comprises: at least one inflatable region, in which the two layers of fabric are substantially not connected to each other, so that gas can be introduced into the space between the two layers to inflate the inflatable region; and at least one non-inflatable region, the non-inflatable region comprising an area over which, for one of the layers of fabric, there is a first number of crossing points of yarns that form the layer of fabric, and there is a second number of connections between the two layers, wherein at each connection a yarn of the layer of fabric extends across to the other layer and passes over the far side of the a yarn of the other layer, and wherein the second number is no more than 0.0033 times the first number.

Advantageously, the second number is no less than 0.00040 times the first number.

Preferably, the second number is between around 0.00055 and around 0.0015 times the first number.

Conveniently, the second number is around 0.00080 times the first number. Another aspect of the present invention provides an air-bag for a motor vehicle, the air-bag being formed from two superposed layers of fabric, each of the layers being woven from a first plurality of yarns and a second plurality of yarns, the yarns of the first plurality of yarns being arranged substantially perpendicular to the yarns of the second plurality of yarns, the layers of fabric being connected to each other at least partially through interweaving of the yarns of the two layers with each other, wherein the air-bag comprises: at least one inflatable region, in which the two layers of fabric are substantially not connected to each other, so that gas can be introduced into the space between the two layers to inflate the inflatable region; and at least one non-inflatable region, the non-inflatable region comprising an area consisting of 180 yarns of the first plurality of yarns and 152 yarns of the second plurality of yarns, and wherein within the area there are no more than 90 connections between the two layers, wherein at each connection a yarn of the layer of fabric extends across to the other layer and passes over the far side of a yarn of the other layer.

Advantageously, within the area there are no fewer than 11 connections between the two layers.

Preferably, within the area there are between around 15 and around 40 connections between the two layers.

Conveniently, within the area there are around 22 connections between the two layers.

Advantageously, the non-inflatable region is not connected to receive compressed gas when the air-bag is inflated.

Preferably, the air-bag comprises one or more gas inlets through which gas is delivered to an interior of the air-bag when the air-bag is inflated, and wherein there is no gas passageway connecting the non-inflatable region with the or any of the gas inlets.

Conveniently, the air-bag further comprises one or more seam regions, located between an inflatable region of the air-bag and the non-inflatable region, the two layers being connected together over the seam regions so that gas within the interior of the inflatable region cannot pass through the seam region to reach the interior of the non-inflatable region.

Advantageously, for the one of the layers, the layer is formed from interwoven warp and weft yarns, wherein the warp and weft yarns are substantially perpendicular to each other.

Preferably, the air-bag is a one-piece woven (OPW) air-bag, and preferably is an inflatable curtain (IC) air-bag.

A further aspect of the present invention comprises an air-bag module comprising an air-bag according to any of the above.

Another aspect of the present invention comprises a vehicle comprising an air-bag module according to the above.

BRIEF DESCRIPTION OF THE DRAWINGS

In order that the present invention may be more readily understood, embodiments thereof will now be described, by way of example, with reference to the accompanying drawings, in which.

DETAILED DESCRIPTION OF THE DRAWINGS

Figure 1:
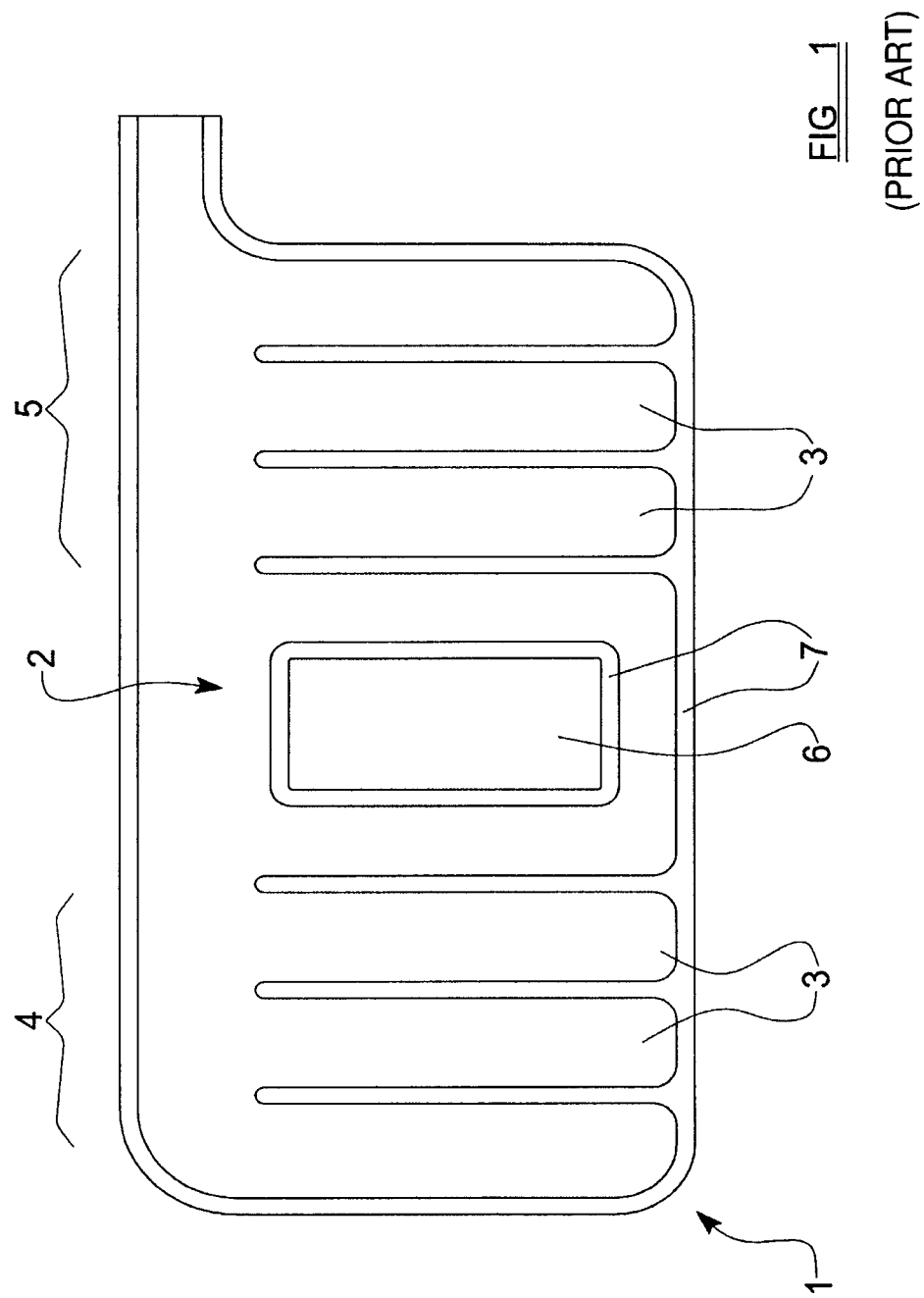
FIG. 1 is a schematic view of a conventional IC air-bag.
Figure 2:
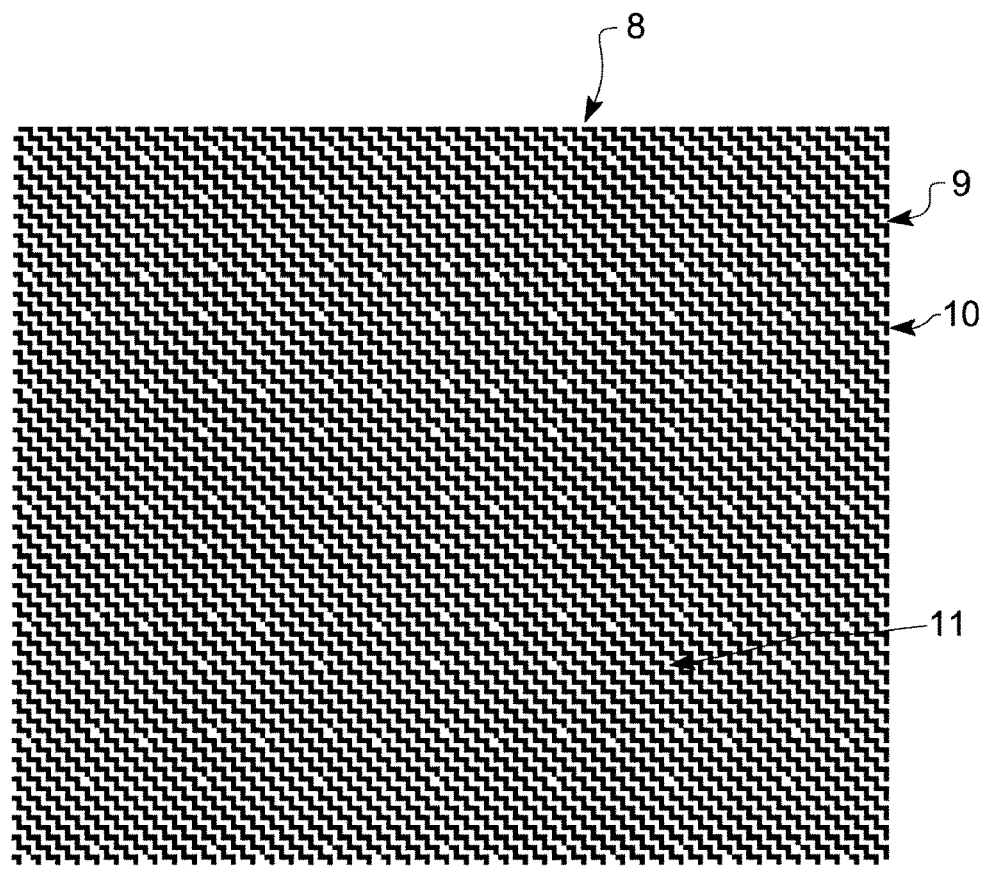
FIG. 2 is a representation of a known weave structure for a non-inflatable region of the air-bag of FIG. 1.

With reference firstly to FIG. 2, a representation is shown of a conventional non-inflatable region for an IC air-bag, for instance as might be used in the known air-bag 1 shown in FIG. 1.

FIG. 2 shows a grid of cells 8, some of which are represented as white 9 and the others of which are represented as being shaded 10. FIG. 2 is a schematic representation of the weave of one of the fabric layers making up a non-inflatable region of air-bag. The grid of cells corresponds to the warp and weft yarns of the fabric layer, with the vertical columns of the grid representing the warp yarns and the horizontal rows of the grid representing the weft yarns (or, alternatively, vice versa).

If the layer shown in FIG. 2 is considered as an upper layer of a two-layer fabric, the shaded cells 10 represent crossing points where the warp yarn passes over the weft yarn, and white cells represent crossing points where the warp yarn passes under the weft yarn The skilled reader will recognise that the overall pattern represented in FIG. 2 is that of a standard plain weave stitching pattern.

In some cells 11 of FIG. 2, white cells appear in locations where, in the normal course of the weave pattern, shaded cells 10 would be expected. These cells 11 represent locations where one of the yarns extends across to the other layer of fabric (not shown), thus forming a connection between the two layers of fabric.

FIG. 2 is a grid of 180×152 cells (representing 180 "ends" and 152 "picks"), i.e. 27,360 cells, representing 180 warp yarns and 152 weft yarns with 27,360 crossing points between the yarns (a crossing point is, for these purposes, a location where a warp yarn and a weft yarn cross one another, when looking at the fabric layer in a direction which is perpendicular to the plane of the layer). Within this grid, some connections are formed between the two fabric layers. A connection is preferably defined as a location in which a yarn from one of the layers extends across to the other of the layers and passes around the far side of one of the yarns of the other of the layers.

If a yarn of one of the layers extends across to the other of the layers and passes around the far side of two consecutive yarns of the other of the layers, this is preferably defined as two connections.

In the example shown in FIG. 2, there are 144 connection points 11 between the layers. Therefore, of all of the crossings between the warp and weft yarns of the layer shown, 0.0052 (approximately) of the crossings represent a connection between the two layers. It may therefore be said that there is a connection density of 0.0052 in the pattern shown in FIG. 2. It will be understood that, if the non-inflatable region of an air-bag is formed from a repeated pattern of this type (i.e. the pattern of FIG. 2 repeated end-on-end and side-to-side an arbitrary number of time), the non-inflatable region will, overall, have a connection density of approximately 0.0052.

Figure 3:
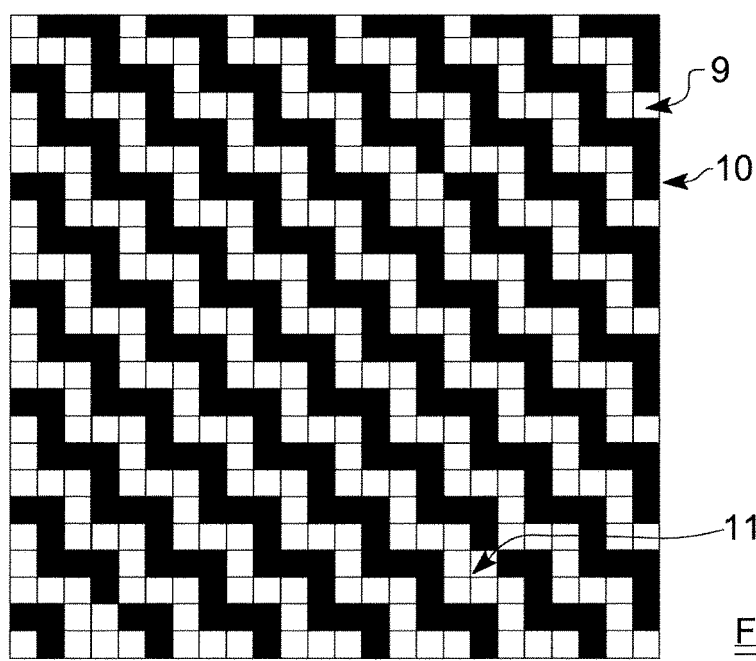
FIGS. 3 to 6 are representations of weave structures embodying the present invention.

For the purposes of clarity, FIG. 3 is a close-up view of a region of the pattern shown in FIG. 2.

The weave pattern shown in FIG. 2 is a known weave pattern, that has been used in non-inflatable regions of IC-type air-bags. In testing of a non-inflatable region woven in this way, the mean stiffness of the non-inflatable region (i.e. the average stiffness, following several measurements) was found to be in the region of 100-140N, measured on the King stiffness scale (the method according to ASTM D 4032 was used to carry out these measurements). In the stiffness values given below, the same measurement method was used, and the various non-inflatable regions that are discussed were formed in substantially the same way, i.e. with the same type and density of yarn, and with the spacing or pitch between the yarns being the same. The stiffness values are therefore directly comparable with one another.

Figure 4:
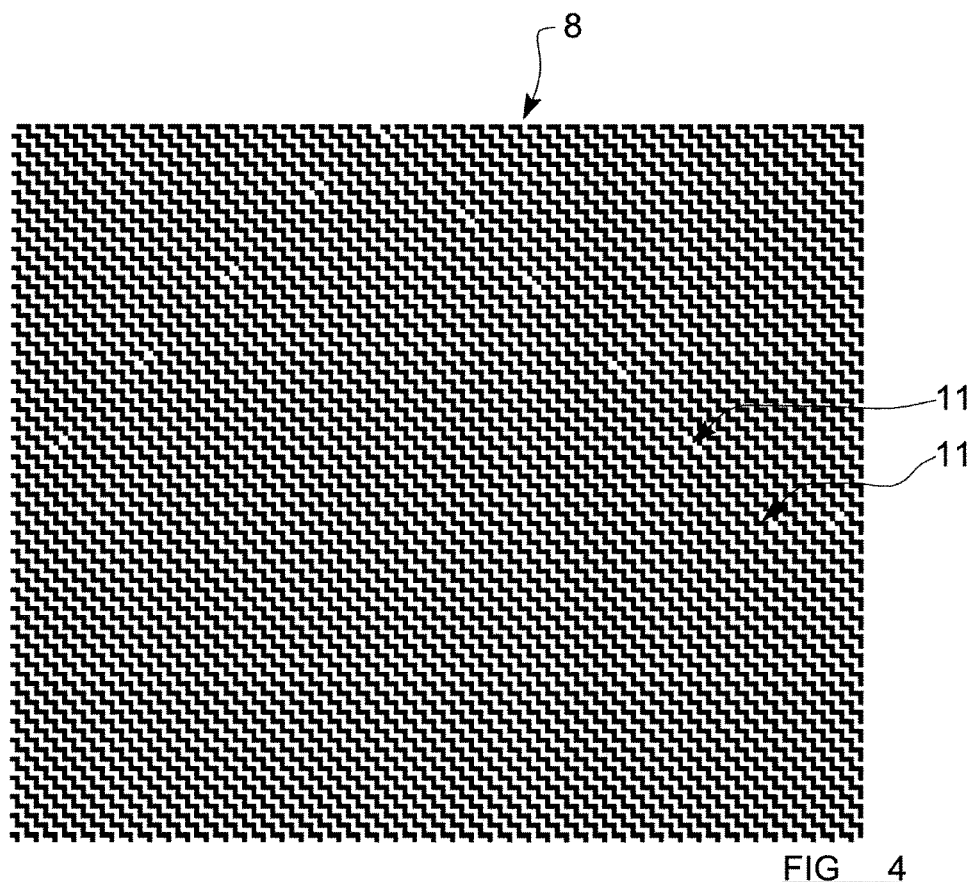

FIG. 4 is a further grid of cells 8, with this grid representing a first weave pattern embodying the present invention. In FIG. 4, relatively short "lines" are formed of cells 11 representing connections between the two layers. In the embodiment shown in FIG. 4, these lines are diagonal (i.e. diagonal with respect to the direction of the warp and weft yarns), and are set at substantially 45° to the directions of both the warp and weft yarns. Each of the lines of connections is generally straight, and the lines are arranged to follow a course that is of a zigzag configuration.

Once again, FIG. 4 shows a grid of 180×152 cells, and there are 22 connections within this grid. This pattern therefore represents a connection density of 0.00080 (approximately).

Following testing it was found that a non-inflatable region formed using this weave pattern had a King stiffness in the range 40-80N. It will be appreciated that this is considerably lower than that of the conventional weave pattern shown in FIG. 2.

Figure 5:
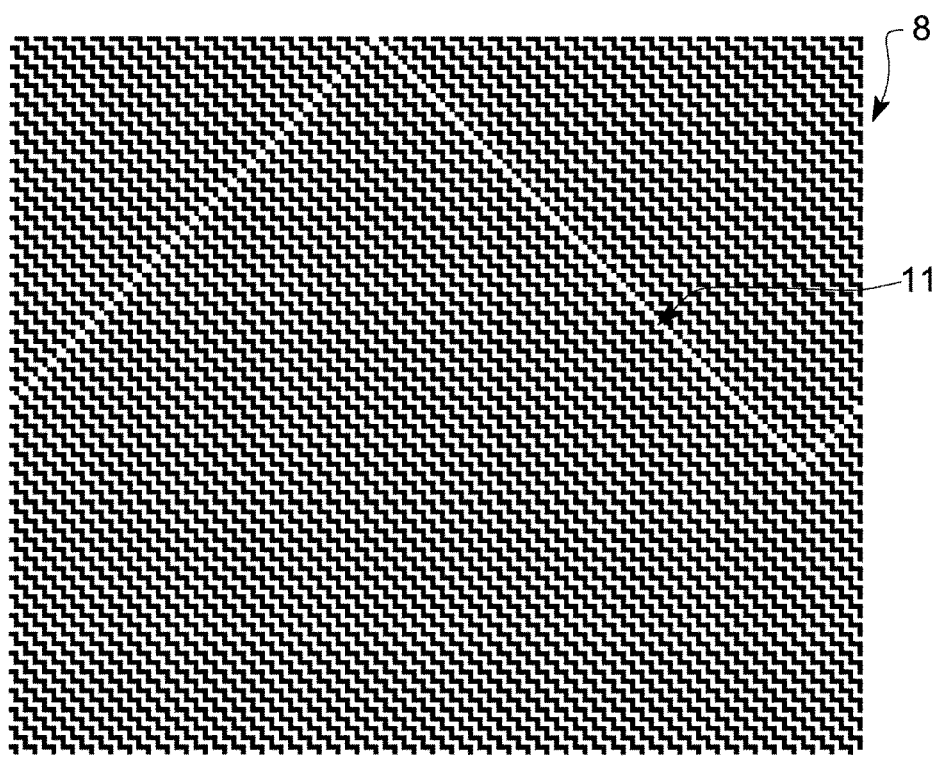

Turning to FIG. 5, this figure shows a further grid of cells 8, with this grid representing a second weave pattern embodying the present invention. In FIG. 5, a substantially continuous line of cells 11 representing connections between the two layers is formed. In the example shown this line has a zigzag configuration. Once again, FIG. 5 shows a grid of 180×152 cells, and there are 90 connections within this grid. This pattern therefore represents a connection density of 0.0033 (approximately).

Following testing it was found that a non-inflatable region formed using this weave pattern also had a King stiffness in the region 40-80N. Again, this is considerably lower than that of the conventional weave pattern shown in FIG. 2.

It is considered that the connection density of the pattern shown in FIG. 5 represents the maximum connection density for weave patterns embodying the present invention. If the connection density exceeds this value, it is likely that the resulting non-inflatable region will have an undesirably high stiffness, thus making it difficult to roll the air-bag for packaging and installation.

Figure 6:
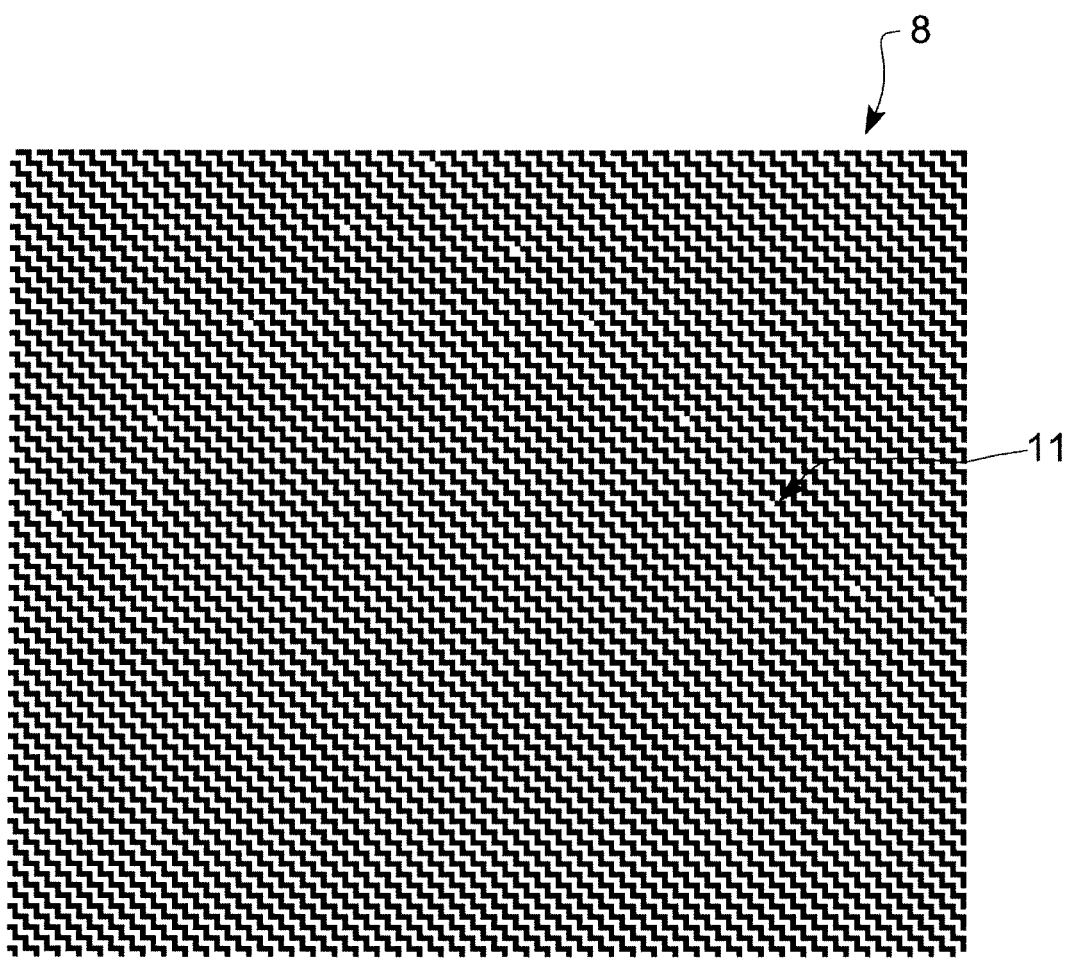

Referring to FIG. 6, this figure shows a further grid of cells 8, with this grid representing a third weave pattern embodying the present invention. This pattern is similar to that shown in FIG. 3, although instead of short lines of connections 11 that follow a zigzag pattern, there are individual, spaced apart connections 11 which follow a zigzag pattern. Once again, FIG. 6 shows a grid of 180×152 cells, and there are 11 connections within this grid. This pattern therefore represents a connection density of 0.00040 (approximately).

Following testing it was found that a non-inflatable region formed using this weave pattern again had a King stiffness in the range 40-80N. This is also considerably lower than that of the conventional weave pattern shown in FIG. 2.

It is considered that the connection density of the pattern shown in FIG. 6 represents the minimum connection density for weave patterns embodying the present invention. It is expected that, if the connection density is less than this value, the two layers of the air-bag will not be connected to each other sufficiently and the air-bag will not retain its correct configuration during rolling/packaging and also during deployment. It has also been found that, with a very low number of connection points, during quality inspection the connection points can be mistaken for defects in the weave pattern.

In preferred embodiments of the invention, in a region consisting of 180 yarns of one type interwoven with 152 yarns of the other type (as discussed above), there are between about 15 and 40 connections, corresponding to a connection density between around 0.00055 and 0.0015.

In the examples given above, the connection points are arranged in lines which follow a zigzag or Z pattern. This has been found to lead to weave patterns which have desirable stiffnesses.

In addition to this, arranging the connection points in this manner makes it relatively easy to distinguish between the connection points and undesirable defects in the weave pattern. During the final stages of production, the woven material is typically inspected closely to see whether it has any defects. This inspection may be carried out by a human operator, or by a machine having one or more cameras. In either technique, having the connection points arranged in a predictable pattern minimises the possibility of the connection points being mistaken for defects, and a camera system can be trained to recognise that these lines of connection points are not to be interpreted as defects. It is expected that if the connection points were to be distributed evenly over the weave pattern, this inspection step would be much more difficult.

A zigzag or Z pattern provides a repeated and predictable pattern that remains roughly at one "level" with respect to the weave pattern.

In use, an air-bag comprising a non-inflatable region according to the above may be formed in any suitable way. For instance, a conventional loom used for weaving OPW air-bags may be used, with the appropriate weave pattern for the non-inflatable region(s) of the air-bag being programmed into the computer system that controls the operation of the loom. The skilled reader will readily appreciate how this may be achieved. The fabric of some or all of the air-bag may then be coated (as is known in the art) for instance to reduce the permeability of the fabric and/or to impart heat/flame resistance to the fabric.

The finished air-bag is rolled and/or folded for installation in a vehicle in the usual way.

It will be appreciated that embodiments of the invention provide air-bags that have improved characteristics, particularly with regard to rolling and packaging, without suffering any loss of performance during inflation and deployment.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. An air-bag for a motor vehicle comprising:
   first and second layers of fabric, the first and second layers being superimposed, each of the first and second layers being woven from a plurality of yarns, the first and second layers of fabric being connected to each other at least partially through interweaving of the yarns of the first and second layers with each other;
   at least one inflatable region, in which the first and second layers of fabric are substantially not connected to each other, so that gas can be introduced into a space between the first and second layers to inflate the inflatable region; and
   at least one non-inflatable region, the non-inflatable region including an area over which, for one of the first and second layers of fabric, there is a first number of crossing points of yarns that form the one of the first and second layers of fabric, and there is a second number of connections between the first and second layers, wherein at each connection a yarn of the one layer of fabric extends across to the other layer and passes over a far side of the a yarn of the other layer, and wherein the second number is no more than 0.0033 times the first number.

2. The air-bag according to claim 1, wherein the second number is no less than 0.00040 times the first number.

3. The air-bag according to claim 1, wherein the second number is between around 0.00055 and around 0.0015 times the first number.

4. The air-bag according to claim 3, wherein the second number is around 0.00080 times the first number.

5. An air-bag for a motor vehicle comprising:
   first and second layers of fabric, the first and second layers being superimposed, each of the first and second layers being woven from a first plurality of yarns and a second plurality of yarns, the yarns of the first plurality of yarns being arranged substantially perpendicular to the yarns of the second plurality of yarns, the first and second layers of fabric being connected to each other at least partially through interweaving of the yarns of the first and second layers with each other;
   at least one inflatable region, in which the first and second layers of fabric are substantially not connected to each other, so that gas can be introduced into a space between the first and second layers to inflate the inflatable region; and
   at least one non-inflatable region, the non-inflatable region having an area defined by 180 yarns of the first plurality of yarns and 152 yarns of the second plurality of yarns, and wherein within the area there are no more than 90 connections between the first and second layers, wherein at each connection a yarn of one of the first and second layers of fabric extends across to the other of the first and second layers and passes over a far side of a yarn of the other layer.

6. The air-bag according to claim 5, wherein within the area there are no fewer than 11 connections between the two layers.

7. The air-bag according to claim 5, wherein within the area there are between around 15 and around 40 connections between the two layers.

8. The air-bag according to claim 5, wherein within the area there are around 22 connections between the two layers.

9. The air-bag according to claim 5, wherein the non-inflatable region is not connected to receive compressed gas when the air-bag is inflated.

10. The air-bag according to claim 9, wherein the air-bag further comprises one or more gas inlets through which gas is delivered to an interior of the air-bag when the air-bag is inflated, and wherein there is no gas passageway connecting the non-inflatable region with any of the gas inlets.

11. The air-bag according to claim 5, further comprising one or more seam regions located between an inflatable region of the air-bag and the non-inflatable region, the first and second layers being connected together over the seam regions so that gas within the interior of the inflatable region cannot pass through the seam region to reach the interior of the non-inflatable region.

12. The air-bag according to claim 5 wherein, one of the first and second layers is formed from interwoven warp and weft yarns, wherein the warp and weft yarns are substantially perpendicular to each other.

13. The air-bag according to claim 5, wherein the air-bag is a one-piece woven (OPW) air-bag.

14. The air-bag according to claim 5, in combination with an air-bag module.

15. The air-bag of claim 14, in combination with the air-bag module of claim 14 and in further combination with a vehicle.

16. The air-bag according to claim 5, wherein the air-bag is an inflatable curtain (IC) air-bag.

* * * * *